March 1, 1966  H. L. BOPPEL  3,237,312
GAGING DEVICE

Filed Oct. 1, 1962  4 Sheets-Sheet 1

INVENTOR
HENRY L. BOPPEL

BY *Edward T. Knipp*

HIS ATTORNEY

March 1, 1966  H. L. BOPPEL  3,237,312
GAGING DEVICE

Filed Oct. 1, 1962  4 Sheets-Sheet 2

INVENTOR
HENRY L. BOPPEL

HIS ATTORNEY

March 1, 1966     H. L. BOPPEL     3,237,312
GAGING DEVICE

Filed Oct. 1, 1962     4 Sheets-Sheet 4

INVENTOR
HENRY L. BOPPEL

BY Edward T. Neary

HIS ATTORNEY

United States Patent Office 3,237,312
Patented Mar. 1, 1966

3,237,312
GAGING DEVICE
Henry L. Boppel, Dayton, Ohio, assignor to The Sheffield Corporation, Dayton, Ohio, a corporation of Delaware
Filed Oct. 1, 1962, Ser. No. 227,385
5 Claims. (Cl. 33—199)

This invention relates to gaging apparatus and more particularly to a gage for measuring dimensions of a workpiece.

One object of the invention is to provide a gage having a carriage with a probe urged outwardly to contact a workpiece and thereby position the carriage along a supporting surface with an air bearing between the supporting surface and the carriage and provisions for the carriage position to be converted to a precision size measurement of the workpiece.

Another object of the invention is to provide a gage having a carriage movable in one direction on a supporting surface and carrying a work contacting probe movable in a direction generally transverse to the direction of carriage movement on the supporting surface thus enabling the measurement of the spaced relations of grooved surfaces in a workpiece by the probe automatically positioning the carriage as it contacts opposite surfaces of the groove contacted.

Another object of the invention is to provide a gage for measuring the spacing between grooved portions such, for example, as grooves or threads on a workpiece, in which a carriage is movable in a frictionless manner on a supporting surface and has a work engaging probe urged outwardly toward the workpiece for engagement with opposite surfaces of a thread to precisely position the carriage along the base with suitable means for measuring the position of the carriage.

Another object of the invention is to provide a gage of the character mentioned having a carriage supported and guided along a straight horizontal operating path by cooperating supporting and guide surfaces with air bearings between the carriage and the surfaces.

Another object of the invention is to provide a gage with the carriage movable along an operating path in a frictionless manner and provisions for engaging with the carriage for sliding and then disengaging to free the carriage during gaging.

Another object of the invention is to provide a gage in which the probe is downwardly inclined on a carriage, with air bearings between the probe and the carriage enabling gravity to urge the probe against opposite surfaces of a groove in a workpiece and thereby position the slidable carriage.

Another object of the invention is to provide air and energy supply means to the carriage in such a fashion that any motion impeding force on the carriage created by the air supply and energy supply means is kept constant.

Other objects and advantages of the invention will be apparent from the following description, the appended claims, and the accompanying drawings.

In the drawings, in which the same reference characters have been applied to like parts in several views.

The present invention provides a gaging device for precision measurement of a workpiece. The invention is shown in one of its many applications as applied, for example, to a gage for measuring the distance between grooved portions, such as threads, of a workpiece. The gage has a carriage which is supported by and movable in a frictionless manner along an operating path on a supporting surface. The carriage carries a work contacting probe movable in a direction generally transverse to the operating path and the carriage is positioned along the operating path by the probe contacting opposite surfaces of a thread on the workpiece. Means are provided for converting carriage position to a measurement.

Figure 3:
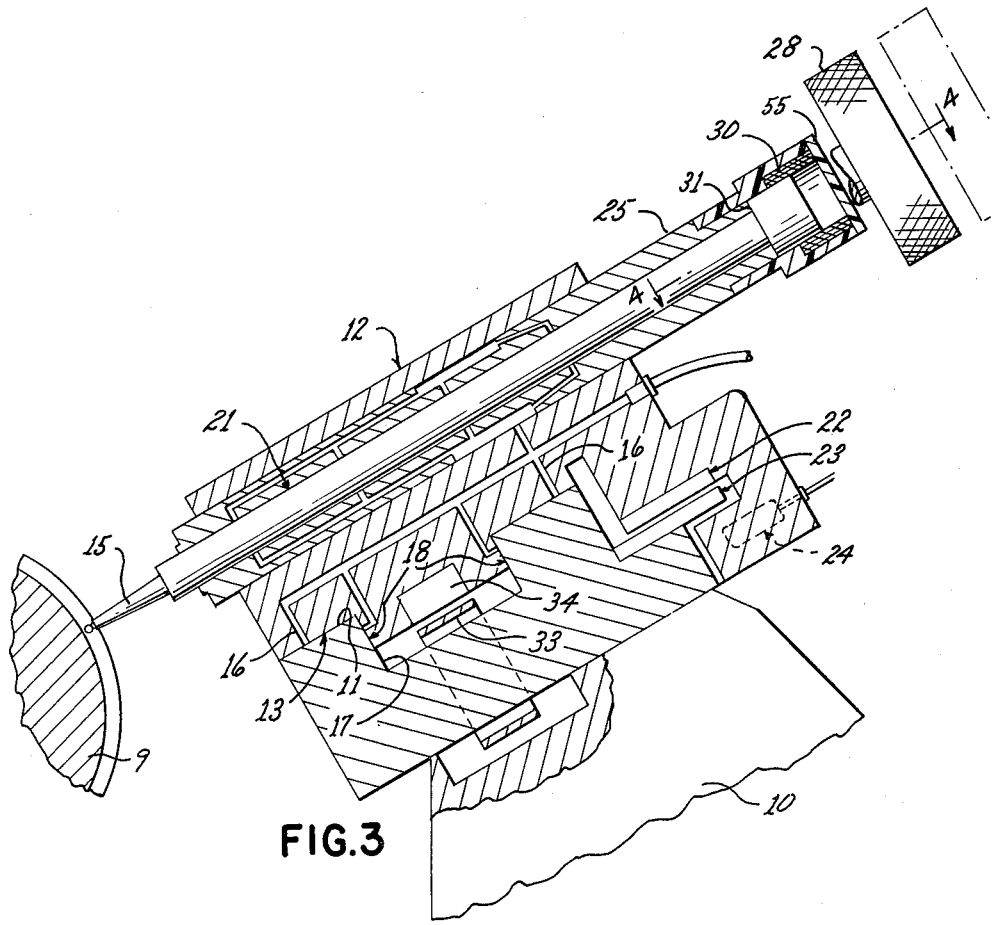
FIGURE 3 is a sectional view on the line 3—3 of FIGURE 1.
Figure 4:
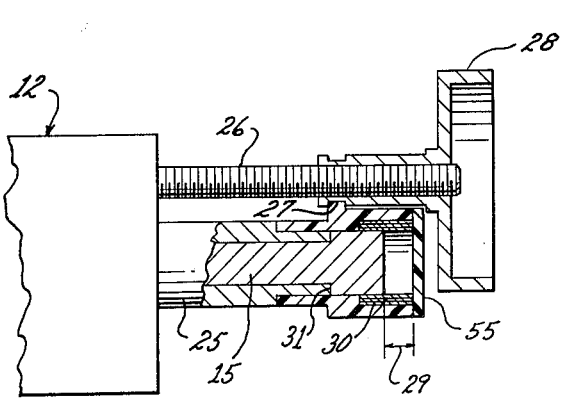
FIGURE 4 is a sectional view on the line 4—4 of FIGURE 3.
Figure 5:
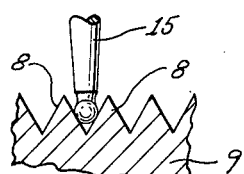
FIGURE 5 is an enlarged sectional view of a work contacting probe engaging a thread.

The embodiment of this invention illustrated in FIGURES 1, 2, 3, and 4 shows a gage, comprising a base 10, with an inclined supporting surface 11, supporting a carriage 12, which is slidable thereon. An air bearing is provided at 13 between the supporting surface 11 and the carriage 12 and is created by properly spacing a number of air exit ports 16 between the surfaces involved and supplying the ports 16 with regulated air pressure. A guide surface 17, on the base 10, cooperating with and at an angle to the supporting surface 11, guides the carriage 12 in a straight horizontal operating path indicated by a line 14. An air bearing is provided at 18 between the guide surface 17 and the carriage 12. The supporting surface 11 and the guide surface 17 are machined precisely and located on the base 10 to cooperate with each other. The air bearings provided between these surfaces and the carriage 12 occupy a space in the order of a few ten thousandths of an inch, and the carriage travels in perfect alignment and in a frictionless manner along a definite operating path. A workpiece 9 to be gaged is carried on the base 10 with its axis parallel to the operating path. The carriage 12 carries a work engaging probe 15 inclined downwardly toward the workpiece 9 and movable in a direction generally transverse to the operating path. The probe 15 is preferably provided with an air bearing at 21 and is of sufficient weight to enable gravity to urge the probe to contact a groove or thread 8 of the workpiece and contact opposite surfaces of the thread as shown in FIGURE 5 to automatically locate the carriage 12 along the operating path. The term groove is used throughout as a general term where abutments or surfaces position a slidable carriage.

Cooperating means are provided on the base and the carriage for determining the location of the carriage as determined by the thread gaged. These cooperating means may be of any suitable character such that, during gaging, free motion of the carriage is provided. For example, a non-contact optical system as disclosed in Patent No. 2,886,717 may be used. In such a system as shown in FIGURE 3, two superimposed gratings are provided with one grating at 22 secured to the carriage 12 and the other grating at 23 secured to the base 10. The gratings are ruled with equally spaced lines to produce together a cyclic coincidence pattern of alternate opacities and transparencies as the carriage moves with respect to the base. A light source at 24 is provided to illuminate the pattern. Photo-electrical devices and appropriate electrical circuitry are provided to convert the pattern movement to a precision measurement.

The carriage 12 includes a body portion such as a sleeve 25 adapted to be adjustably positioned in a direction generally transverse to the operating path 14 of the carriage by a screw 26 threaded into the carriage. The screw engages a suitable projection 27 on the sleeve 25 enabling positioning of the sleeve by rotating a knurled knob 28 attached to the screw. The sleeve 25 carries the work engaging probe 15 for movement in a direction generally transverse to the operating path. The air bearing is provided between the work engaging probe and the body member or sleeve. This sleeve projects and supports the work contacting probe to a position relatively close to the workpiece location to accommodate workpieces of different sizes and makes it possible to use a work contacting probe 15 with limited travel, as indicated at 29 in FIGURE 4, in the sleeve 25 if desired for any reason such as economy or standardization of probes for example. FIGURE 4 shows the probe 15 with travel limited by a stop 55 at its upper end and by a shoulder 31 on the sleeve portion at its lower end. A clamping arrangement 32 is provided to fix the sleeve 25 in a position corresponding to the size of a workpiece 9 to be measured.

The carriage 12 is moved along the operating path by an operating means such as a magnetic line or tape 33. The tape is engaged with the carriage by energizing means for engaging and disengaging the magnetic tape such as an electromagnet 34 attached to the carriage. The magnetic tape is arranged in a closed loop with one side moving in close proximity to the electromagnet. A supporting means such as brackets 35 and pulleys 36 are provided on the base 10 for the magnetic tape 33. A means for moving the magnetic tape 33 consists of an electric motor 37 driving a pulley 36. A solenoid winding 30 is attached to the sleeve 25. The upper portion of the work contact probe also functions as a plunger to form a solenoid to retract the work contact probe 15 away from the workpiece 9. The probe is retracted in preparation to another gaging operation and prior to engagement of the magnetic tape 33 for movement of the carriage 12 along the operating path.

Figure 1:
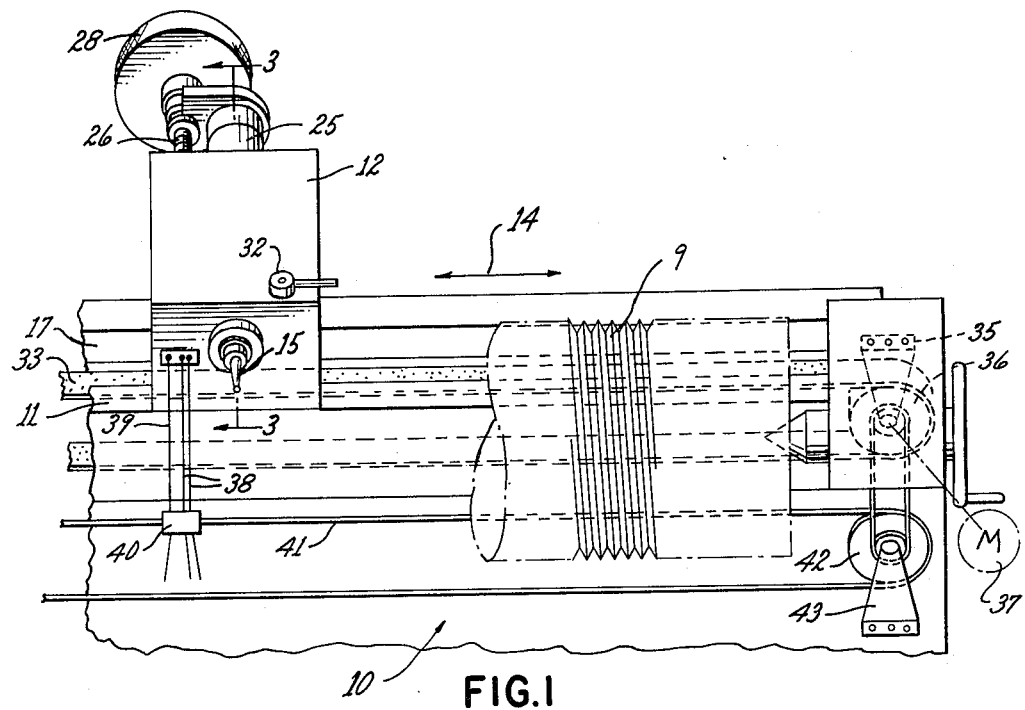
FIGURE 1 shows a portion of a front elevation of a gage embodying the present invention.
Figure 2:
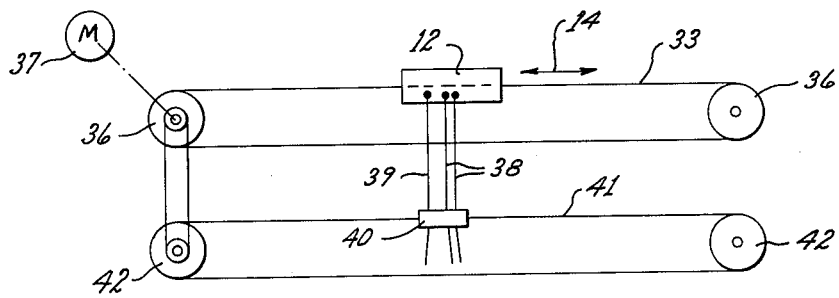
FIGURE 2 is a schematic arrangement of the gage embodiment of FIGURE 1.

Energy supply means such as flexible electrical lines 38 are provided for the solenoid 30 and the electromagnet 34 on the carriage 12. An air supply means consisting of a flexible air supply line 39 is provided to supply air to the air bearings. The supply lines 38 and 39 are attached to the carriage and then to a holder 40. To keep any motion impeding force induced by the supply lines on the carriage constant, a means for moving the holder in accordance with movement of the carriage is provided. One means for moving the holder 40 is shown as a line 41 traveling in a closed loop on pulleys 42 supported by brackets 43 attached to the base 10 and driven by the same motor 37 driving the magnetic tape 33 and at the same rate of speed as the carriage. The illustration in FIGURE 1 shows the holder 40 relatively positioned on a line 41 below the carriage 12.

In a typical gaging operation electrical energy is provided to the carriage thereby causing the solenoid to retract the work contact probe 15 and then causing the electromagnet 34 to engage the magnetic tape 33. Air is supplied to the air bearings continuously. The electric motor 37 is then energized to move the magnetic tape and thereby move the carriage to a desired position along the operating path. The solenoid, motor, and electromagnet are then de-energized and the gravity urged probe 15 is allowed to locate the free floating carriage 12 by contacting opposite surfaces of a thread 8 on the workpiece 9. Cooperating means as previously mentioned are provided on the base and the carriage to determine the position of the carriage with respect to the base. A measurement of the distance between any two threads on a workpiece can be determined by comparing any two carriage positions.

Figure 6:
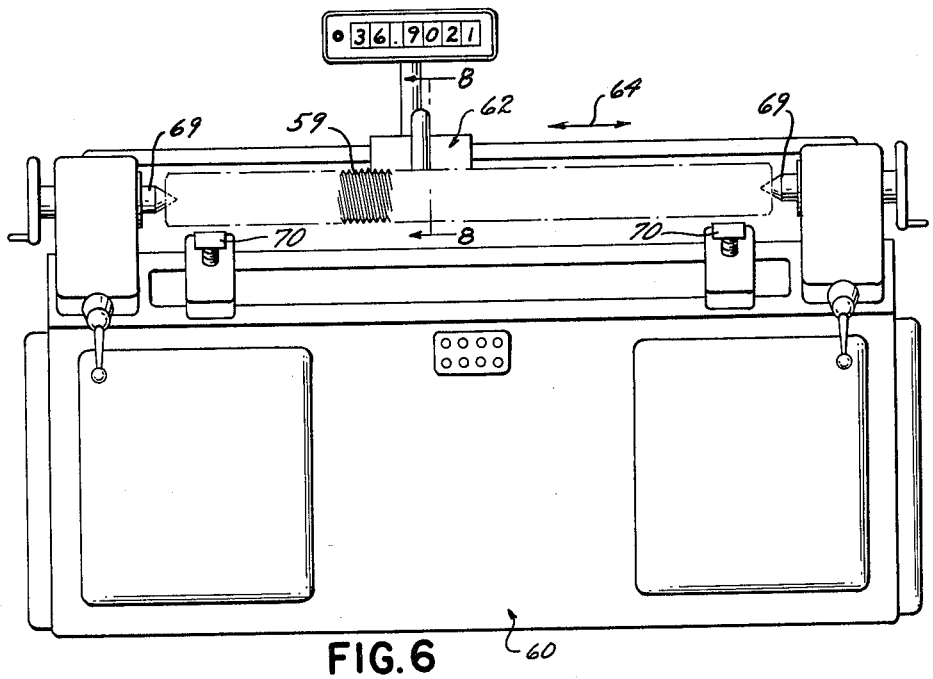
FIGURE 6 is a front elevation of the gage in another embodiment.
Figure 7:
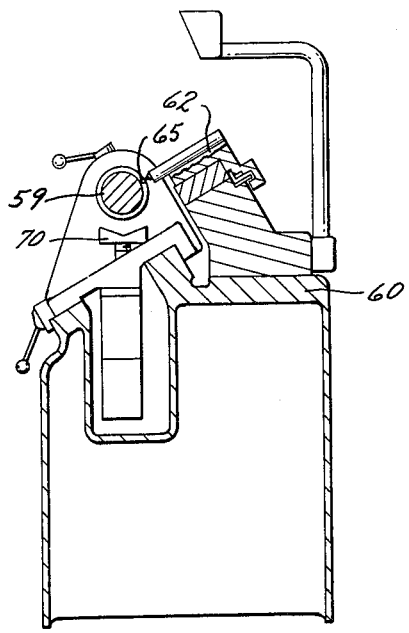
FIGURE 7 is a sectional end elevation of the gage shown in FIGURE 6.
Figure 8:
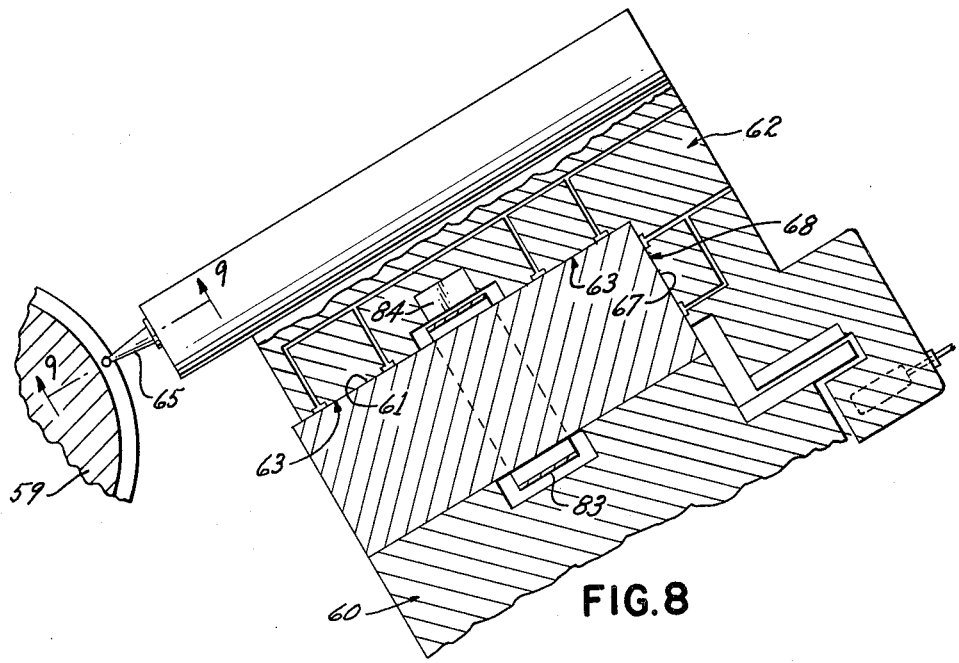
FIGURE 8 is an enlarged sectional view on the line 8—8 of FIGURE 6.
Figure 10:
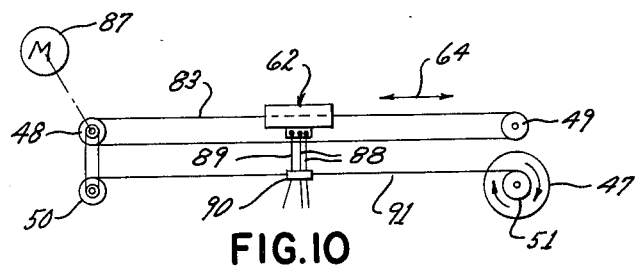
FIGURE 10 is a schematic arrangement of the means for moving a carriage and related components.
Figure 9:
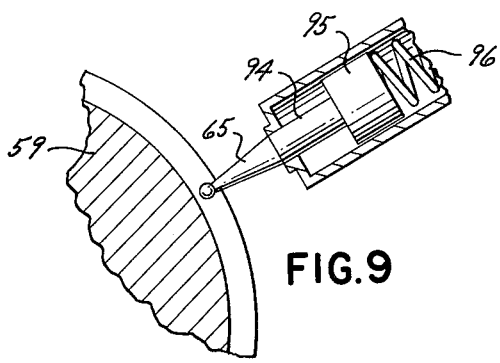
FIGURE 9 is an enlarged sectional view on the line 9—9 of FIGURE 8.

In the modification shown in FIGURES 6, 7, 8, 9 and 10 the carriage 62 is mounted on a base 60 with an inclined supporting surface 61 and an air bearing at 63 between the supporting surface and the carriage 62. A guide surface 67 at an angle to the supporting surface is provided to guide the carriage along an operating path shown by line 64 on the supporting surface. An air bearing having a pressure regulated supply which is separate from the supply to the bearing between the carriage 62 and the inclined supporting surface 61 is provided at 68 between the guide surface 67 and the carriage 62. A workpiece 59 to be gaged is installed on the base with its axis parallel to the operating path. In the illustration of FIGURES 6 and 7 the workpiece 59 is carried on centers 69; but, could be carried on a pair of V blocks 70. The carriage 62 carries a work engaging probe 65, as shown in FIGURE 9, having a stem 94 and a weighted body portion 95. The probe is yieldingly urged outwardly toward the workpiece by a spring 96 and gravity in a direction generally transverse to the operating path. As previously described and as illustrated in FIGURE 5, the probe urges against a groove or thread of the workpiece and contacts opposite surfaces of the thread to automatically locate the carriage along the operating path. Cooperating means as previously described are provided on the base 60 and the carriage 62 for determining the location of the carriage as determined by the thread gaged.

The probe 65 may be retracted and the carriage 62 moved along the operating path manually or automatically by any suitable means. In this modification the carriage 62 may be moved along the operating path by a magnetic tape 83. An electromagnet 84 attached to the carriage may be energized to engage the magnetic tape arranged in a closed loop with one side moving in close proximity to the electromagnet. A supporting means such as brackets and pulleys 48 and 49 are provided on the base for the magnetic tape. A means for moving the magnetic tape 83 consists of an electric motor 87 driving a pulley 48.

Energy supply means such as flexible electrical lines 88 are provided for the electromagnet 84. An air supply means consisting of a flexible air supply line 89 is provided for each air bearing. The supply lines 88 and 89 are attached to the carriage 62 and then to a holder 90. To keep any motion impeding force induced by the supply lines on the carriage constant, a means for moving the holder 90 in accordance with movement of the carriage is provided. One means for moving the holder is shown schematically in FIGURE 10 as a line 91 traveling over drums or pulleys 50 and 51 which are the same radius as the pulleys 48 and 49 supporting the magnetic tape 83 and are appropriately supported on the base and keep a constant radius as the line 91 is wound or unwound. The driven pulley 51 uses a spring device 47 to keep the line 91 under constant tension. The driving pulley 50 is powered by the same motor 87 driving the magnetic tape 83 operating means and moves the line 91 and holder 90 the same rate of speed as the carriage 62.

In a typical gaging operation using this modification of the invention, air is supplied to the bearings and the probe 65 or the carriage 62 carrying the probe is retracted manually away from the workpiece 59. Retraction of the carriage temporarily eliminates the air bearing at 68 between the guide surface and the carriage, but because this air bearing at 68 is independent this retraction has no adverse effect. The electromagnet 84 is engaged with the magnetic tape 83 and the electric motor 87 is then energized to move the carriage to a gaging position along the operating path. Once this position is determined the carriage is allowed to move on the inclined supporting surface 61 toward the workpiece and the yieldingly urged probe 65 allowed to locate the free floating carriage 62 by contacting opposite surfaces of a thread on a workpiece 59. The position of the carriage with respect to the base is determined by the previously described cooperating means on the base and the carriage and a measurement of the distance between any two threads on the workpiece can be determined by comparing any two carriage positions.

While the forms of apparatus herein described constitute a preferred embodiment of the invention it is to be understood that the invention is not limited to these precise forms of apparatus, and that changes may be made therein without departing from the scope of the invention which is defined in the appended claims.

I claim:

1. A gage comprising a base with an inclined supporting surface, a carriage supported by and slidable along the supporting surface, means for providing an air bearing between the supporting surface and the carriage, a guide surface on the base and at an angle to the inclined supporting surface cooperating with the supporting surface to guide the carriage in a straight horizontal operating path, means for providing an air bearing between the guide surface and the carriage, operating means for sliding the carriage along the operating path while leaving said carriage free for positioning therealong during gaging, means on the base for supporting a workpiece with its axis parallel to the operating path, a work engaging probe carried by the carriage for movement in a downwardly inclined path substantially transverse to said operating path and toward the workpiece location and having means for providing an air bearing between the probe and the carriage enabling gravity to urge the probe to contact the workpiece, air supply lines for said air bearings fastened to said carriage, means supporting said lines adjacent said carriage for movement therewith but independent thereof to thereby relieve said carriage for free unrestrained movement, and mechanically spaced apart cooperating means on said base and said carriage for determining the location of said carriage with respect to said base while keeping said carriage free to move on said supporting surface.

2. A gage comprising a base with a supporting surface; a carriage supported by and slidable in a predetermined operating path on the supporting surface; means for providing an air bearing between the supporting surface and the carriage; operating means for sliding the carriage along the operating path comprising an attaching means fastened to the carriage, operating means arranged for movement in close proximity to the attaching means and normally entirely free of any connection with the carriage, means on the base for supporting the operating means, means for moving the operating means, means operable to engage and disengage the operating means to the attaching means for sliding of the carriage and free positioning of said carriage, means on the base for supporting a grooved workpiece; a work engaging probe inclined downwardly toward the workpiece location and carried by said carriage for movement in a path substantially transverse to said operating path and toward the workpiece location and means for providing an air bearing between the probe and the carriage enabling gravity to urge the probe to engage a groove of the workpiece and contact opposite surfaces of the groove to automatically locate the carriage along its operating path, air supply lines for said air bearings fastened to said carriage, means supporting said lines adjacent said carriage for movement therewith but independent thereof to thereby relieve said carriage for free unrestrained movement, and cooperating means on the base and the carriage for determining the location of the carriage as determined by the groove gaged.

3. A gage comprising a base with an inclined supporting surface, a carriage supported by and slidable along the supporting surface, means for providing an air bearing between the supporting surface and the carriage, a guide surface on the base and at an angle to the inclined supporting surface cooperating with the supporting surface to guide the carriage in a straight horizontal operating path, means for providing an air bearing between the guide surface and the carriage, operating means for sliding the carriage along the operating path, means for engaging and disengaging said operating means, energy supply means for said engaging and disengaging means extending from the carriage, means on the base for supporting a grooved workpiece, a work engaging probe carried by said carriage for movement in a path substantially transverse to said operating path and toward the workpiece location and having means for urging the probe to contact said grooved workpiece to automatically locate the carriage along its operating path, air supply means extending from the carriage for the air bearings, a holder attached to the air supply means and energy supply means, means for moving the holder in accordance with movement of the carriage to maintain constant any motion impeding force created by the supply means on the carriage, and cooperating means on the base and the carriage for determining the location of the carriage as determined by said automatic location.

4. A gage comprising a base with an inclined supporting surface, a carriage supported by and slidable along the supporting surface, means for providing an air bearing between the supporting surface and the carriage, a guide surface on the base and at an angle to the inclined supporting surface cooperating with the supporting surface to guide the carriage in a straight horizontal operating path, means for providing an air bearing between the guide surface and the carriage, operating means for sliding the carriage along the operating path, means for engaging and disengaging said operating means, energy supply means for said engaging and disengaging means extending from the carriage, means on the base for supporting a grooved workpiece, a body member carried by the carriage with means for adjustable movement in a path substantially transverse to said operating path and toward the workpiece location, a work engaging probe carried by said member for movement in an inclined path substantially transverse to said operating path and toward the workpiece location and having means for providing an air bearing between the probe and the carriage enabling gravity to urge the probe to engage a groove of the workpiece and contact surfaces of the groove to automatically locate the carriage along its operating path, air supply means extending from the carriage for the air bearings, a holder attached to the air supply and energy supply means, means for moving the holder in accordance with movement of the carriage to maintain constant any motion impeding force created by the supply means on the carriage, and cooperating means on the base and the carriage for determining the location of the carriage as determined by the groove gaged.

5. A gage comprising, a base, means on the base for supporting a grooved workpiece, a supporting surface on said base, a carriage supported on said supporting surface, an air supply conduit in said carriage having an external connector for connection to an air pressure source, means providing supporting and guiding air bearings between said supporting surface and said carriage supporting and guiding said carriage for free movement in a predetermined operating path parallel to said workpiece, first air passage means in said carriage communicating between said air supply conduit and said means providing supporting and guiding air bearings, means for sliding said carriage on said supporting surface, a body portion adjustably mounted on said carriage for movement in a path transverse said operating path, said body portion having bearing surface means inclined downwardly toward the workpiece location, a work engaging probe supported for downwardly inclined sliding movement on said bearing surface means and carried by said body portion for movement along said transverse path and toward the workpiece location, means for providing an air bearing between said downwardly inclined probe and said body portion enabling gravity to urge the probe to engage a groove of the workpiece and contact opposite surfaces of the groove to automatically locate said carriage along its operating path in a frictionless manner on said supporting and guiding air bearings, second air passage means in said carriage and said body member providing an air flow path from said air supply conduit and to said air bearing between said downwardly inclined work engaging probe and said body portion throughout all adjusted positions of said body portion, and cooperating means on said base and said carriage for determining the position of said carriage with respect to said base while enabling said carriage to move freely on said supporting surface.

References Cited by the Examiner

UNITED STATES PATENTS

| | | | |
|---|---|---|---|
| 1,956,812 | 5/1934 | Smith | 33—199 |
| 2,025,215 | 12/1935 | Munn | 33—199 |
| 2,538,622 | 1/1951 | Johnson. | |
| 2,547,681 | 4/1951 | Aller | 33—199 |
| 2,847,859 | 8/1958 | Lynott | 74—37 |
| 2,942,385 | 6/1960 | Pal | 33—Air Digest |
| 3,028,677 | 4/1962 | Schonfield | 33—Air Digest |

OTHER REFERENCES

"Gas Bearings," in Product Engineering, Nov. 23, 1959, pp. 68–71.

ROBERT B. HULL, *Primary Examiner.*